United States Patent
Workman et al.

(10) Patent No.: US 10,207,359 B2
(45) Date of Patent: Feb. 19, 2019

(54) THERMITE WELDING

(71) Applicant: EDISON WELDING INSTITUTE, INC., Columbus, OH (US)

(72) Inventors: David P. Workman, Dublin, OH (US); Seth C. Shira, Cardington, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 114 days.

(21) Appl. No.: 15/276,230

(22) Filed: Sep. 26, 2016

(65) Prior Publication Data

US 2017/0028504 A1    Feb. 2, 2017

Related U.S. Application Data

(63) Continuation-in-part of application No. 14/257,587, filed on Apr. 21, 2014, now abandoned.

(60) Provisional application No. 62/232,595, filed on Sep. 25, 2015.

(51) Int. Cl.
| | |
|---|---|
| *B23K 20/00* | (2006.01) |
| *B23K 23/00* | (2006.01) |
| *B23K 35/36* | (2006.01) |
| *B23K 20/16* | (2006.01) |
| *B23K 1/00* | (2006.01) |

(52) U.S. Cl.
CPC ........... *B23K 23/00* (2013.01); *B23K 1/0006* (2013.01); *B23K 20/165* (2013.01); *B23K 35/3601* (2013.01); *B23K 35/3613* (2013.01)

(58) Field of Classification Search
CPC .......... B23K 23/00; B23K 9/208; B23K 9/20; B23K 35/3601; B23K 35/3613; B23K 1/0006; B23K 20/165

USPC ...................... 228/207, 214, 223, 224, 234.3
See application file for complete search history.

(56) References Cited

U.S. PATENT DOCUMENTS

| | | | | |
|---|---|---|---|---|
| 2,277,014 A | * | 3/1942 | Carlson ................... | E01B 11/52 249/134 |
| 2,421,184 A | | 5/1947 | Candy | |
| 2,459,957 A | | 1/1949 | Palmer | |
| 2,482,093 A | * | 9/1949 | Carlson ................... | B23K 35/34 164/54 |

(Continued)

FOREIGN PATENT DOCUMENTS

| | | | | |
|---|---|---|---|---|
| EP | 1060822 A2 | * | 12/2000 | ............. B23K 9/205 |
| SU | 1366338 A | * | 1/1988 | |

*Primary Examiner* — Kiley S Stoner
(74) *Attorney, Agent, or Firm* — Frost Brown Todd LLC

(57) ABSTRACT

A process for welding metallic sections that includes providing first and second metallic sections to be welded together, and wherein the welded rail sections will include a weld fusion zone that further includes a weld terminus at each rail section; providing thermite welding dies for use in welding the metallic sections together; covering the thermite welding dies with an oxide displacing or oxide dissolving flux added locally to the edges of the thermite welding dies that are immediately adjacent to the weld fusion zone and the metallic sections; positioning the thermite welding dies on the metallic sections in the region where the metallic sections are to be joined together; and initiating an exothermic reaction between the thermite welding dies and the metallic sections by introducing molten metal into the region where the metallic sections are to be joined together, wherein the exothermic reaction creates a weld between the metallic sections.

19 Claims, 1 Drawing Sheet

(56) References Cited

U.S. PATENT DOCUMENTS

| | | | |
|---|---|---|---|
| 2,515,191 A * | 7/1950 | Carpenter | B22D 7/02 164/108 |
| 2,950,380 A | 8/1960 | Van Den Blink | |
| 3,011,255 A * | 12/1961 | Washburn | B23K 11/02 228/125 |
| 3,037,109 A | 5/1962 | Glover | |
| 3,070,874 A * | 1/1963 | Davis, Jr. | F16L 41/04 164/54 |
| 3,100,338 A * | 8/1963 | Henry | B22D 19/00 174/94 R |
| 3,182,173 A | 5/1965 | Dash | |
| 4,062,485 A * | 12/1977 | Andersen | B23K 23/00 114/51 |
| 4,117,297 A | 9/1978 | Sholle | |
| 4,214,144 A | 7/1980 | Spiegelberg | |
| 4,413,169 A * | 11/1983 | Cameron | B23K 25/00 219/53 |
| 4,429,207 A * | 1/1984 | Devletian | B23K 25/00 219/137 R |
| 4,531,042 A | 7/1985 | Shoup et al. | |
| 4,681,998 A | 7/1987 | Kon | |
| 4,841,116 A * | 6/1989 | Kimura | B23K 9/038 219/73 |
| 5,062,903 A * | 11/1991 | Bronan | B23K 23/00 148/24 |
| 5,171,378 A * | 12/1992 | Kovarik | B23K 23/00 148/23 |
| 5,175,405 A * | 12/1992 | Karimine | B23K 9/038 219/54 |
| 5,490,888 A * | 2/1996 | Assel | B23K 23/00 149/108.2 |
| 5,565,116 A | 10/1996 | Barton et al. | |
| 6,327,766 B1 | 12/2001 | Cardente | |
| 2002/0104953 A1 * | 8/2002 | Triantopoulos | B23K 23/00 249/86 |
| 2003/0178168 A1 * | 9/2003 | Triantopoulos | B23K 23/00 164/54 |
| 2004/0169017 A1 | 9/2004 | Sakoda | |
| 2006/0054626 A1 * | 3/2006 | Delcroix | B23K 23/00 220/371 |
| 2008/0006613 A1 | 1/2008 | Ulrich et al. | |
| 2013/0126498 A1 | 5/2013 | Hsu et al. | |

\* cited by examiner

THERMITE WELDING

CROSS-REFERENCE TO RELATED APPLICATIONS

This patent application is a continuation-in-part of U.S. patent application Ser. No. 14/257,587 filed on Apr. 22, 2014 and entitled "Drawn Arc Stud Welding System", the disclosure of which is hereby incorporated by reference herein in its entirety and made part of the present U.S. utility patent application for all purposes. This patent application also claims the benefit of U.S. Provisional Patent Application Ser. No. 62/232,595 filed on Sep. 25, 2015 and entitled "Improved Thermite Welding," the disclosure of which is hereby incorporated by reference herein in its entirety and made part of the present U.S. utility patent application for all purposes.

BACKGROUND OF THE INVENTION

The described invention relates in general to welding and joining systems and processes, and more specifically to improved processes and techniques for using thermite welding in various applications.

Exothermic welding, also known as exothermic bonding and thermite welding (TW), is a welding process that employs molten metal for permanently joining metallic materials to one another. The process uses an exothermic reaction of a thermite composition to heat metal and typically requires no external source of heat or current. The chemical reaction that produces the heat is typically an aluminothermic reaction that occurs between aluminum powder and a metal oxide. Despite the overall utility of this form of welding, lapping and lack of fusion are very significant problems with regard to thermite type exothermic welding. Die fit improvements have reduced these problems somewhat but these issues still account for more than 50% of the fatigue failures that occur in thermite-type weld joints in railway applications. Improvement has also been achieved through correcting fit-up issues associated with dies currently in use; however, the problem still exists in many cases. In one example, die fit improvements have focused on preventing liquid iron from simultaneously coming into contact with open atmosphere and cold base material. Another current approach involves adding more molten material to improve the wetting of the filler metal onto the rail surface. This approach leads to an increased heat affected zone size, which is an undesirable outcome.

Exothermic welding is often used in railway (e.g., locomotive) applications, such as for example, welding signal bonds to railroad tracks or joining rail sections to one another. Conventional thermite welding used for railway applications utilizes a mold that wraps around a butt-joint groove that encompasses two rail ends. Considerable effort is spent in mating die fit up to eliminate atmospheric contamination to reduce oxidation of the liquid within the die set. Liquid iron generated by a thermite reaction is then poured into the die set from the top of the mold to fill up the groove, thereby creating a continuous weld between the two rail ends. The most significant area of failure of thermite welds created for railway applications is again due to lapping and lack of fusion presumably due to inadequate die fit up. Lapping occurs when the molten steel flows onto the parent rail material yet doesn't bond or form a contiguous weld joint. This is often identified as a die fit up issue that allows atmospheric contamination to occur and that may create a lack of wetting at the transition from the molten metal filling the die mold cavity and the parent material. As previously described, this lack of wetting is currently overcome by adding excess heat and by adding liquid iron material to increase the temperature in the weld zone. This approach yields some improvements, but still results in an exacerbated heat affected zone softening.

Increasing axle loads and tonnages experienced by North American railroads have increased the demands placed upon all track components, including thermite welds. Thermite rail welds have historically been a weak link in continuous welded rail due to their cast microstructure. The thermite welding method is used worldwide as a field welding method for the final stage in rail installation. Flash-butt welding is mainly used in plant welding, while thermite welding is mainly used in field welding. Thus, there is an ongoing need for improved thermite welding processes for use in various railway applications.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a process for welding metallic sections is provided. This process includes providing first and second metallic sections, wherein the first and second metallic sections are to be welded together, and wherein the welded rail sections include a weld fusion zone that further includes a weld terminus at each rail section; providing thermite welding dies for use in welding the metallic sections together; covering the thermite welding dies with an oxide displacing or oxide dissolving flux, wherein the flux is added locally to the edges of the thermite welding dies that will be immediately adjacent to the weld fusion zone and the metallic sections; positioning the thermite welding dies on the metallic sections in the region where the metallic sections are to be joined together; and initiating an exothermic reaction between the thermite welding dies and the metallic sections by introducing molten metal into the region where the metallic sections are to be joined together, wherein the exothermic reaction creates a weld between the metallic sections.

In accordance with another aspect of the present invention, a process for welding rail sections is provided. This process includes providing first and second rail sections, wherein the first and second rail sections are to be welded together, and wherein the welded rail sections will include a weld fusion zone that will further includes a weld terminus at each rail section; providing thermite welding dies for use in welding the rail sections together; covering the thermite welding dies with an oxide displacing or oxide dissolving flux, wherein the flux is added locally to the edges of the thermite welding dies that will be immediately adjacent to the weld fusion zone and the rail sections; positioning the thermite welding dies on the rail sections in the region where the rail sections are to be joined together; and initiating an exothermic reaction between the thermite welding dies and the rail sections by introducing molten metal into the region where the rail sections are to be joined together, wherein the exothermic reaction creates a weld between the rail sections.

In yet another aspect of this invention, an alternate process for welding rail sections is provided. This process includes providing first and second rail sections, wherein the first and second rail sections are to be welded together, and wherein the welded rail sections will include a weld fusion zone that will further includes a weld terminus at each rail section; providing thermite welding dies for use in welding the rail sections together; adding an oxide displacing or oxide dissolving flux to the thermite welding dies, wherein the flux is added as an insert to the thermite welding dies to cover the weld terminus at each rail section; positioning the thermite welding dies on the rail sections in the region where the rail sections are to be joined together; and initiating an exothermic reaction between the thermite welding dies and the rail sections by introducing molten metal into the region where the rail sections are to be joined together, wherein the exothermic reaction creates a weld between the rail sections.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawing, which is incorporated into and form a part of the specification, schematically illustrates one or more exemplary embodiments of the invention and, together with the general description given above and detailed description given below, serves to explain the principles of the invention, and wherein.

DETAILED DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The processes and techniques of this invention eliminate lapping, undercut, and other deleterious geometric features that may occur at the transition from the fusion zone in a thermite weld into the base metal. The present invention includes a notch reduction technique for exothermic welding that provides enhancement of thermite weld joint geometry and is useful for thermite welding of rail sections and for other thermite welding process.

An exemplary embodiment of this invention includes a two-step reaction that occurs at the terminus of the fusion zone onto the rail surface. Initially, an oxidizing material is ignited to produce oxygen at the weld terminus. This then oxidizes iron and creates heat at the edge of the weld locally. This heat then starts the next reaction in which an oxide displacing or dissolving flux is added locally to the edges of the dies immediately adjacent to the fusion zone and the parent rail. The heat of the oxidation is required to locally heat the edge of the fusion zone and activate the flux in the weld terminus area. An oxygen producing compound, coating, or flux may also be beneficial by itself as it will likely change the surface tension of the deposited metal.

Figure 1:
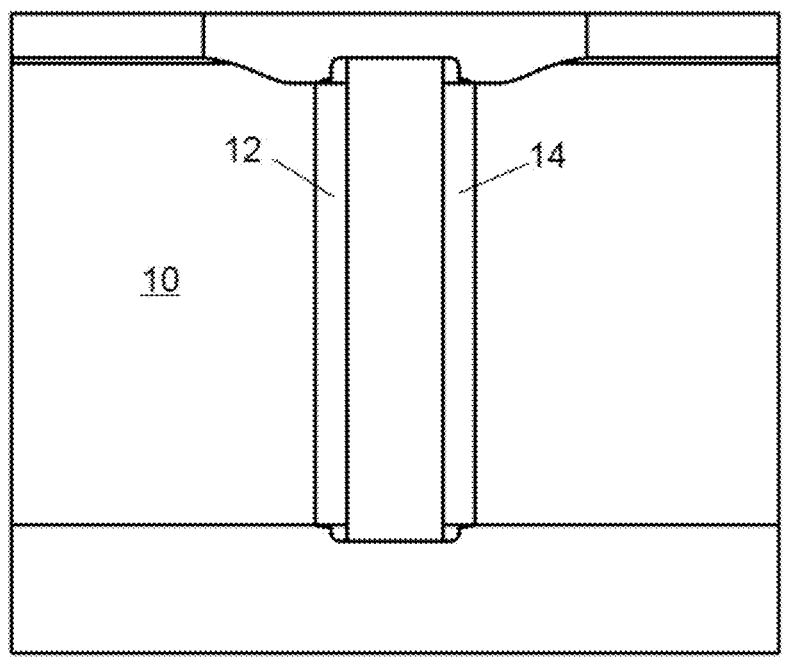
FIGS. 1 and 2 are front and perspective views respectively of a section of a thermite welding die and areas of flux application to the thermite welding die section during an exothermic rail welding process, in accordance with an exemplary embodiment of the present invention.
Figure 2:
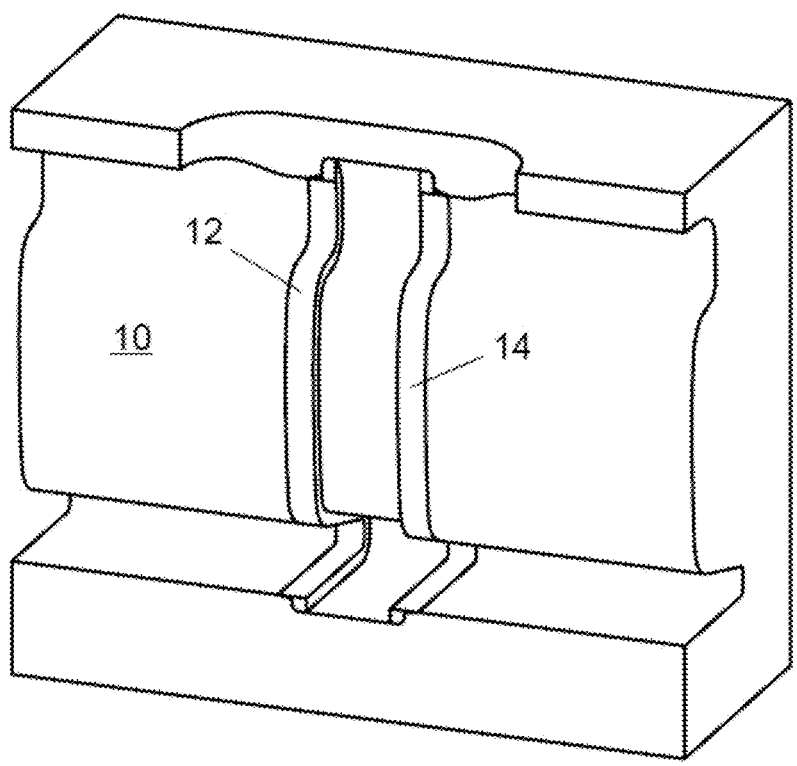

Another embodiment of this invention places the flux in the bottom of die 10 or near the entry point of the molten metal to help dissolve the flux such that it precedes the molten metal and can then dissolve undesirable oxides from the surfaces as the molten metal engages the material. Lack of heat at the weld terminus will likely not activate the flux in the weld areas of interest due to lack of sufficient localized heating. Additionally, the flux may boil out from the molds due to the time, scale and turbulence of the high temperature liquid iron material filling the dies. For use in a rail weld joint, the flux is attached to a sand cast mold (i.e., die 10) along the terminal areas (12 and 14) of the casting area as shown in FIGS. 1 and 2. This flux could be either infused into the mold or "glued" to the mold after the mold is processed. The glue oxidizes as previously described to help locally heat the terminus area. The application of the flux reduces oxidation of the surrounding base metal, locally improves wetting between the molten exothermic casting materials, and produces a geometrically improved joint geometry. This approach creates an exothermic weld joint with an enhanced fatigue life. The flux may also reduce the amount of heat required to make a weld as minimal extra heat is now required to fuse the cast metal into the sidewalls of the rail. An oxidizing material or a deoxidizing material or combination thereof may be attached to the sand cast mold in an exothermic weld joint to enhance to weld joint geometry, eliminate cold lapping in the joint, and produce a "smoother" weld joint transition back into the parent metal. This is particularly important in fatigue situations, such rail-to-rail welds, where exothermic welds are employed.

Another embodiment of this invention feeds shielding gas into the die set in order to locally provide a reaction gas, oxidizing gas, initially and a shielding gas secondarily. The flux should be located in the area shown in FIGS. 1 and 2 (see reference numerals 12 and 14), which extends from the edge of the fusion zone to outside the fusion zone area on the die face. It may however cover the entire area of the die molds to ensure that enough flux and oxidizer are active on the fusion boundaries to enhance the wet out. The use of flux and oxygenating materials may also be advantageous in achieving a high local heat input along the entire length of the weld fusion boundaries. This improved approach eliminates the need for added heat input macroscopically which is only partially effective and highly operator dependent. The addition of oxidizer and flux at the edge of the fusion zone by way of the die promotes wetting of the cast material onto the surface of the rail thus eliminating cold lapping onto the oxide laden surface of the rail. The use of the oxygenating substance on the die edges will burn away the lapping material further improving the weld joint geometry.

Novel features of the present invention include adding flux at the terminus of the fusion zone in a die set. By placing the flux in contact with the fusion zone by way of a die or mold, it facilitates the thermite material in wetting out onto the rail surface. Local oxidizing agents should be present to initially heat the weld terminus sufficiently for the flux to become active in this area. Gluing or otherwise impregnating the die mold with a flux aids in stripping oxides off of the rail surface. This material is introduced to the weld joint indirectly rather than directly. The flux may include both oxidizing and deoxidizing components to enhance the wetting of the molten material onto the solid material. Initially oxidizing the weld terminus to create heat and then to deoxidize it to create a desired weld toe geometry. The oxidation of the weld terminus is unique as most welds and thermite dies are designed to prevent oxygen and atmospheric intrusion. Adding the oxygen at the correct location is an important aspect of this approach. This invention also uses organic materials to provide fluxing on the weld joint. Fluxes in general are described as mineral compounds and the organics react at lower temperatures initially than mineral compounds. Paper for example is an organic that might be used to consume oxygen.

As the total heat input is reduced, it is now possible to reduce the reinforcement area around the weld and create a better fatigue resistance geometry. The reduction in weld area outside the shape is possible as the localized oxidation provide heat where needed to create a sound weld joint without cold lap or undercut. As the requirement for heat is reduced with the localized intense heating provided by the coatings, the gap between the rails may be reduced to create a more fatigue friendly and batter resistant weld joint. Polyvinyl alcohol or other oxidizing compound or material may be added to the die itself to provide extra heating locally or macroscopically to improve molten steel material flow in the die. This may include adding the oxidizing material and flux beyond the terminus of the weld. Adding oxidizing material to the weld area on the die such that more heat is added locally to oxidize the molten steel and add heat.

Advantageous aspects of the present invention include: (i) covering the dies for thermite welding process with a flux; (ii) the flux may be oxide dissolving or displacing; (iii) covering the die with an oxygen generating substance to generate heat locally at the terminus to enhance the wetting of liquid metal; (iv) a combination of the two previous aspects; (v) flux may be added as an insert to the die to cover the weld terminus area (see reference numerals 12 and 14 in FIGS. 1 and 2); (vi) the flux may contain boron, silicon, manganese, carbon, or combinations thereof; (vii) the flux may be attached using polyvinyl alcohol (PVA); (viii) the flux may be attached using polyethylene glycol (PEG); (ix) the flux may be mixed into or embedded into the dies mechanically; (x) reducing preheat temperature and gap in the dies due to reduction of required heat in a thermite weld with flux added; (xi) using an oxidizer insert in the die to aid in adding heat locally to the weld terminus; and (xii) using an oxidizer insert to improve flow in the die to promote heating in a general area where required. Examples of suitable oxidizers include polyvinyl alcohol (PVA), polyethylene glycol (PEG), glycerin and potassium nitrate.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A process for welding metallic sections, comprising:
   (a) providing first and second metallic sections, wherein the first and second metallic sections are to be welded together, and wherein the first and second metallic sections include a weld fusion zone that further includes a weld terminus at each metallic section;
   (b) providing thermite welding dies for use in welding the metallic sections together;
   (c) covering the thermite welding dies with an oxide displacing or oxide dissolving flux, wherein the flux is added locally to the edges of the thermite welding dies that will be immediately adjacent to the weld fusion zone and the metallic sections;
   (d) positioning the thermite welding dies on the metallic sections in the region where the metallic sections are to be joined together; and
   (e) initiating an exothermic reaction between the thermite welding dies and the metallic sections by introducing molten metal into the region where the metallic sections are to be joined together, wherein the exothermic reaction creates a weld between the metallic sections.

2. The process of claim 1, further comprising attaching the flux to the thermite welding dies using polyvinyl alcohol or polyethylene glycol.

3. The process of claim 1, further comprising adding oxygen inside the thermite welding dies at the weld terminus or toe to locally create heat by iron oxidation.

4. The process of claim 1, further comprising adding an oxidizer insert for improving flow in the thermite dies to promote heating in a predetermined area.

5. The process of claim 4, wherein the oxidizer includes polyvinyl alcohol, polyethylene glycol, glycerin, and potassium nitrate.

6. The process of claim 1, wherein the flux includes boron, silicon, manganese, carbon, or combinations thereof.

7. The process of claim 1, wherein the flux is mechanically mixed or embedded into the thermite dies.

8. A process for welding rail sections, comprising:
   (a) providing first and second rail sections, wherein the first and second rail sections are to be welded together, and wherein the welded rail sections include a weld fusion zone that further includes a weld terminus at each rail section;
   (b) providing thermite welding dies for use in welding the rail sections together;
   (c) covering the thermite welding dies with an oxide displacing or oxide dissolving flux, wherein the flux is added locally to the edges of the thermite welding dies that will be immediately adjacent to the weld fusion zone and the rail sections;
   (d) positioning the thermite welding dies on the rail sections in the region where the rail sections are to be joined together; and
   (e) initiating an exothermic reaction between the thermite welding dies and the rail sections by introducing molten metal into the region where the rail sections are to be joined together, wherein the exothermic reaction creates a weld between the rail sections.

9. The process of claim 8, further comprising attaching the flux to the thermite welding dies using polyvinyl alcohol or polyethylene glycol.

10. The process of claim 8, further comprising adding oxygen inside the thermite welding dies at the weld terminus or toe to locally create heat by iron oxidation.

11. The process of claim 8, further comprising adding an oxidizer insert for improving flow in the thermite dies to promote heating in a predetermined area.

12. The process of claim 11, wherein the oxidizer includes polyvinyl alcohol, polyethylene glycol, glycerin, and potassium nitrate.

13. The process of claim 8, wherein the flux includes boron, silicon, manganese, carbon, or combinations thereof.

14. The process of claim 8, wherein the flux is mechanically mixed or embedded into the thermite dies.

15. A process for welding rail sections, comprising:
(a) providing first and second rail sections, wherein the first and second rail sections are to be welded together, and wherein the welded rail sections include a weld fusion zone that further includes a weld terminus at each rail section;
(b) providing thermite welding dies for use in welding the rail sections together;
(c) adding an oxide displacing or oxide dissolving flux to the thermite welding dies, wherein the flux is added as an insert to the thermite welding dies to cover the weld terminus at each rail section;
(d) positioning the thermite welding dies on the rail sections in the region where the rail sections are to be joined together; and
(e) initiating an exothermic reaction between the thermite welding dies and the rail sections by introducing molten metal into the region where the rail sections are to be joined together, wherein the exothermic reaction creates a weld between the rail sections.

16. The process of claim 15, further comprising adding oxygen inside the thermite welding dies at the weld terminus or toe to locally create heat by iron oxidation.

17. The process of claim 15, further comprising adding an oxidizer insert for improving flow in the thermite dies to promote heating in a predetermined area.

18. The process of claim 17, wherein the oxidizer includes polyvinyl alcohol, polyethylene glycol, glycerin, and potassium nitrate.

19. The process of claim 15, wherein the flux includes boron, silicon, manganese, carbon, or combinations thereof.

* * * * *